US009020213B1

(12) United States Patent
Ionita

(10) Patent No.: US 9,020,213 B1

(45) Date of Patent: Apr. 28, 2015

(54) METHODS AND SYSTEMS FOR DETECTING BIOMETRIC CHARACTERISTICS IN AN IMAGE

(71) Applicant: Mircea Ionita, Dublin (IE)

(72) Inventor: Mircea Ionita, Dublin (IE)

(73) Assignee: Daon Holdings Limited, George Town (KY)

( * ) Notice: Subject to any disclaimer, the term of this patent is extended or adjusted under 35 U.S.C. 154(b) by 58 days.

(21) Appl. No.: 14/055,938

(22) Filed: Oct. 17, 2013

(51) Int. Cl.
*G06K 9/00* (2006.01)

(52) U.S. Cl.
CPC ........ *G06K 9/00281* (2013.01); *G06K 9/00295* (2013.01); *G06K 9/00255* (2013.01); *G06K 9/00906* (2013.01)

(58) Field of Classification Search
None
See application file for complete search history.

(56) References Cited

U.S. PATENT DOCUMENTS

| | | | | |
|---|---|---|---|---|
| 5,859,921 | A * | 1/1999 | Suzuki | 382/118 |
| 6,868,183 | B1 * | 3/2005 | Kodaira et al. | 382/203 |
| 8,594,374 | B1 * | 11/2013 | Bozarth | 382/103 |
| 8,942,434 | B1 * | 1/2015 | Karakotsios et al. | 382/117 |
| 2007/0122036 | A1 * | 5/2007 | Kaneda et al. | 382/190 |
| 2010/0014718 | A1 * | 1/2010 | Savvides et al. | 382/117 |
| 2014/0056510 | A1 * | 2/2014 | Van Bree et al. | 382/154 |
| 2014/0133743 | A1 * | 5/2014 | Cheon et al. | 382/159 |
| 2015/0023606 | A1 * | 1/2015 | Morishita | 382/219 |
| 2015/0049179 | A1 * | 2/2015 | Son et al. | 348/78 |

OTHER PUBLICATIONS

Chau, Michael, and Margrit Betke. Real time eye tracking and blink detection with usb cameras. Boston University Computer Science Department, 2005.*

Grauman, Kristen, et al. "Communication via eye blinks—detection and duration analysis in real time." Computer Vision and Pattern Recognition, 2001. CVPR 2001. Proceedings of the 2001 IEEE Computer Society Conference on. vol. 1. IEEE, 2001.*

* cited by examiner

*Primary Examiner* — Aaron W Carter
*Assistant Examiner* — Narek Zohrabyan
(74) *Attorney, Agent, or Firm* — Kevin McDermott, Esq.

(57) ABSTRACT

A method for detecting biometric characteristics in a captured biometric data image is provided that includes determining, by a processor, an approximate location for a biometric characteristic in a frame included in captured biometric data, and determining region of interest positions over the frame. Moreover, the method includes calculating a set of feature values for each position, generating a displacement for each set of feature values and generating a median displacement, and adjusting the biometric characteristic location by the median displacement.

9 Claims, 7 Drawing Sheets

1/3 W
1/3 W
1/4 H
h
l
38
36
34-R
34-L
22
24

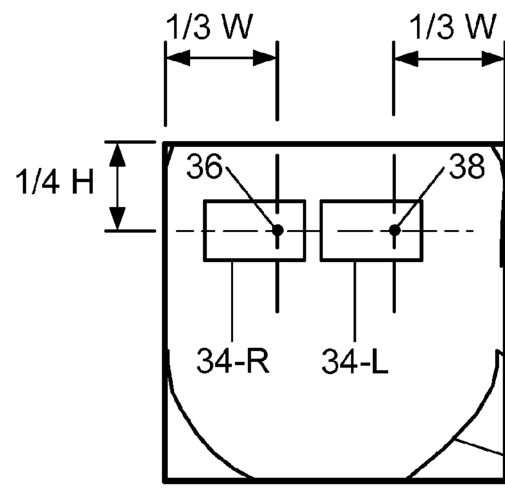
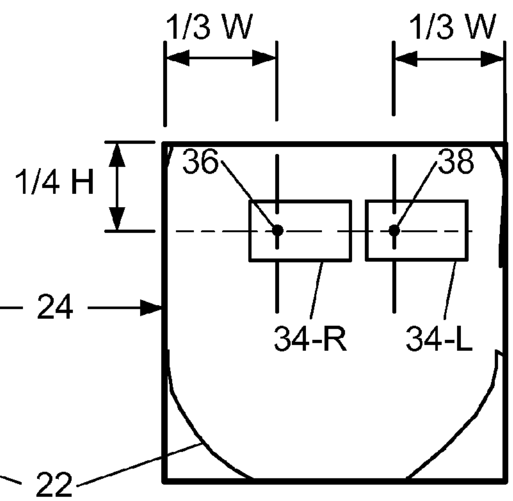
FIG. 6
FIG. 7
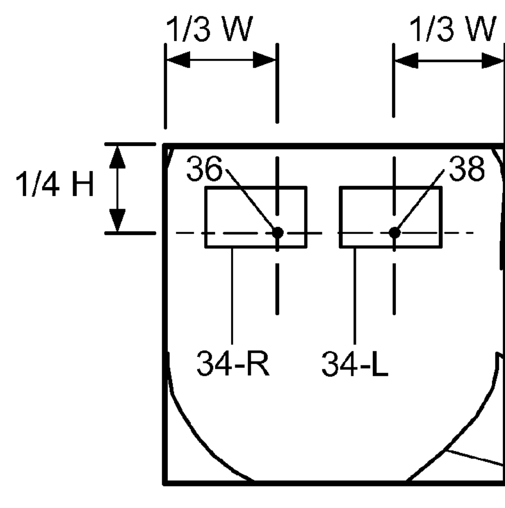
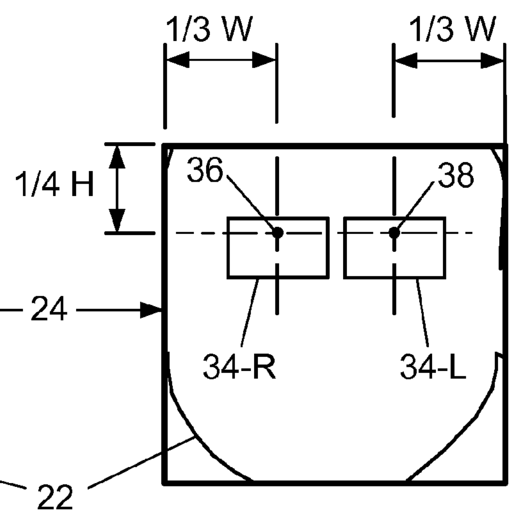
FIG. 8
FIG. 9

66

| Most Relevant Windows | | | | |
|---|---|---|---|---|
| Type | Width | Height | X Coord. | Y Coord. |
| I | 4 | 2 | 5 | 1 |
| I | 4 | 2 | 2 | 2 |
| I | 6 | 3 | 7 | 3 |
| I | 6 | 3 | 3 | 3 |
| II | 4 | 2 | 2 | 3 |
| II | 4 | 2 | 8 | 3 |
| II | 6 | 2 | 5 | 1 |
| II | 6 | 3 | 5 | 4 |
| III | 4 | 2 | 5 | 2 |
| III | 4 | 2 | 8 | 3 |
| III | 6 | 2 | 3 | 3 |
| III | 6 | 3 | 7 | 2 |
| IV | 3 | 4 | 5 | 3 |
| IV | 3 | 4 | 5 | 4 |
| IV | 3 | 3 | 2 | 2 |
| IV | 3 | 3 | 2 | 3 |
| IV | 4 | 4 | 5 | 3 |
| V | 2 | 2 | 5 | 2 |
| V | 3 | 3 | 5 | 3 |
| V | 4 | 4 | 2 | 2 |
| V | 4 | 4 | 8 | 3 |
| V | 2 | 2 | 5 | 1 |

METHODS AND SYSTEMS FOR DETECTING BIOMETRIC CHARACTERISTICS IN AN IMAGE

BACKGROUND OF THE INVENTION

This invention relates generally to image detection, and more particularly, to methods and systems for detecting biometric characteristics in an image.

Users conduct transactions with many different entities in person and remotely over the Internet. Transactions may be network-based transactions for purchasing items from a merchant website or may involve accessing confidential information from a website remotely over the Internet. Entities that own such websites typically require successfully identifying users as the result of an authentication transaction before permitting users to conduct the transactions.

During remotely conducted network-based authentication transactions, users typically interact with an authentication system to prove their claim of identity. Such interactions generally provide a claim of identity and biometric data captured from the user to the authentication system. However, imposters have been known to impersonate users during authentication transactions by providing a false claim of identity supported by fraudulent biometric data in an effort to deceive an authenticating entity into concluding that the imposter is the person they claim to be. Such impersonations are known as spoofing.

Impostors currently use many methods to obtain or create fraudulent biometric data that can be submitted during authentication transactions. For facial biometric data imposters have been known to obtain two-dimensional pictures of others, from social networking sites, and present the obtained pictures to a camera during authentication to support a false claim of identity. Such fraudulent biometric data are known to be difficult to detect using known liveness detection methods because it is difficult to detect characteristics in the biometric data.

Methods are known that arrange a window about an image of captured facial biometric data. Although all facial characteristics may appear within the window, the location of facial characteristics such as eyes, nose, and mouth within the image cannot be accurately determined. It is known to be difficult, time consuming, and expensive to accurately detect and locate facial features from such images that may be used to determine liveness of users and to authenticate the identity of users.

BRIEF DESCRIPTION OF THE INVENTION

In one aspect, a method for detecting biometric characteristics in a captured biometric data image is provided that includes determining, by a processor, an approximate location for a biometric characteristic in a frame included in captured biometric data, and determining region of interest positions over the frame. Moreover, the method includes calculating a set of feature values for each position, generating a displacement for each set of feature values and generating a median displacement, and adjusting the biometric characteristic location by the median displacement.

In another aspect, a system for detecting biometric characteristics in an image is provided that includes a processor and a memory. The memory is configured to store locations of a biometric characteristic. The processor is programmed to determine an approximate location for a biometric characteristic in a frame, determine region of interest positions over the frame, and calculate a set of feature values for each position. Moreover, the processor is programmed to generate a displacement for each set of feature values and generate a median displacement, and adjust the biometric characteristic location by the median displacement.

BRIEF DESCRIPTION OF THE DRAWINGS

FIG. 6 is an enlarged plan view of the user image shown in FIG. 5; however, the regions of interest are translated horizontally;

FIG. 7 is an enlarged plan view of the user image shown in FIG. 5; however, the regions of interest are translated horizontally;

FIG. 8 is an enlarged plan view of the user image shown in FIG. 5; however, the regions of interest are translated vertically;

FIG. 9 is an enlarged plan view of the user image shown in FIG. 5; however, the regions of interest are translated vertically;

DETAILED DESCRIPTION OF THE INVENTION

Figure 1:
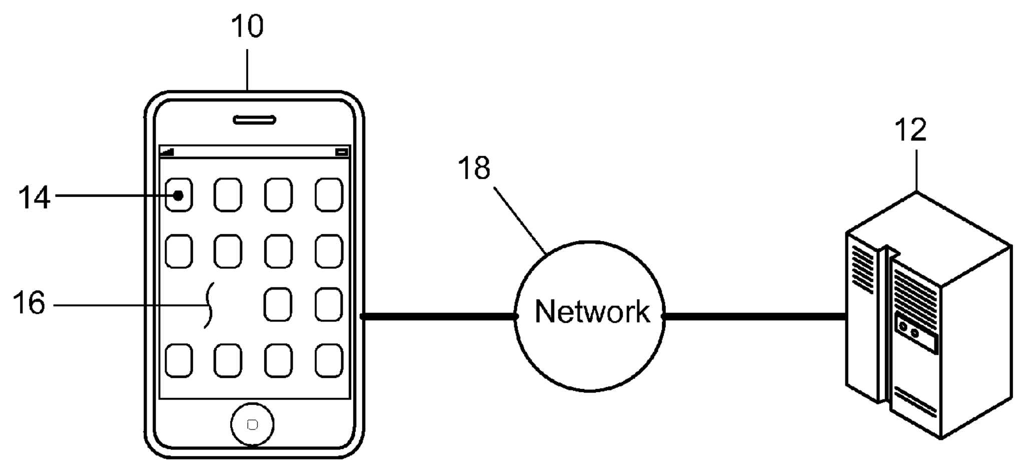
FIG. 1 is a diagram including an exemplary data capture device and an exemplary Authentication Computer System for detecting biometric characteristics in an image.

FIG. 1 is a diagram including an exemplary data capture (DC) device 10 and an exemplary Authentication Computer (AC) System 12 that may be used for detecting biometric characteristics in an image. The DC device 10 is a smart phone that may store applications and data therein, execute applications, may display at least one of text and images, and is associated with a user. Such applications include face tracker applications. When executed, face tracker applications generate a window positioned about an image included in a frame of captured authentication data. Face detection applications may also be stored in the DC device 10. Moreover, the DC device 10 may execute algorithms that create tree-based models and may execute the tree-based models.

The DC device 10 may include buttons and icons 14 for at least entering commands and invoking applications stored therein, and a display screen 16 such as, but not limited to, a Liquid Crystal Display (LCD) that displays at least one of text and images. Moreover, the DC device 10 may include cameras (not shown) and a microphone (not shown). The applications stored in the DC device 10 may cause the DC device 10 to perform the functions described herein for the DC device 10 and for the AC system 12, as well as for any other systems (not shown) and devices (not shown) operable to communicate with the DC device 10. Data that may be stored in the DC device 10 includes, but is not limited to, captured biometric authentication data, enrollment data records, any information that may be used to authenticate users, feature values, and horizontal and vertical displacements.

Although the exemplary DC device 10 is a smart phone, the DC device 10 may alternatively be any device capable of at least storing data and applications, executing the applications, displaying at least one of text and images, and capturing and transmitting data. Such other devices may be portable or stationary and include, but are not limited to, a cellular phone, a tablet computer, a laptop computer, a personal computer (PC) equipped with a web camera (web cam), any type of device having wireless capabilities such as a personal digital assistant (PDA), entertainment devices, and gaming consoles. Entertainment devices include, but are not limited to, televisions. Gaming consoles include, but are not limited to, Xbox 360 and Nintendo Wii.

The DC device 10 is configured to communicate with the AC system 12, other systems (not shown), and devices (not shown) over a communications network 18. The communications network 18 is a 4G communications network. Alternatively, the communications network 18 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet. The network 18 may also be any type of wired network. Moreover, the DC device 10 is configured to conduct wireless communications such as cellular telephone calls and to wirelessly access the Internet over the network 18.

The DC device 10 may be used to capture authentication data and to process the captured authentication data. Moreover, the DC device 10 may detect biometric characteristics in captured authentication data images in any manner. For example, the DC device 10 may detect the position of eyes in captured facial biometric image data. The DC device 10 may also determine user liveness and authenticate user identities during authentication transactions based on the captured or processed authentication data.

Alternatively, the DC device 10 may transmit captured authentication data to the AC system 12 for use in conducting authentication transactions and detecting biometric characteristics in captured authentication data. The DC device 10 may also process captured authentication data prior to transmitting it to the AC system 12. For example, the DC device 10 may create a biometric template from captured authentication data and then transmit the biometric template to the AC system 12. Any number of DC devices 10, that are each associated with a same or different user, may communicate with the AC system 12.

The AC system 12 includes components such as, but not limited to, a web server, a database server, an application server, a directory server and a disk storage unit that may be used to store any kind of data. The disk storage unit may store at least one database such as, but not limited to, an authentication database. The application server stores applications therein that cause the AC system 12 to perform the functions described herein. The AC system 12 also includes a database management server and an authentication server. The database management server may be used to facilitate transferring data to and from the disk storage device. The authentication server may perform matching of any feature or information associated with users to authenticate the identity of users as described herein.

The AC system 12 is also configured to communicate with the DC device 10, other systems (not shown), and devices (not shown) over the network 18. Other systems (not shown) that the AC system 12 and the DC device 10 may communicate with include computer systems of service providers such as, but not limited to, financial institutions, medical facilities, national security agencies, and merchants. Other devices that the AC system 12 and the DC device 10 may communicate with over the network 18 include, but are not limited to, smart phones, tablet computers, laptop computers, personal computers and cellular phones.

The authentication database may store at least authentication data of each of a plurality of users in enrollment data records. The authentication data may be any kind of information that may be used to authenticate users such as, but not limited to, Global Positioning System (GPS) coordinates, pass-phrases, biometric authentication data, and any combination thereof. Biometric authentication data may correspond to any biometric characteristic desired to be used as a basis of authentication such as, but not limited to, voice, face, finger, iris, eye, palm, and electrocardiogram, and any combination of voice, face, finger, iris, eye, palm, and electrocardiogram. The biometric authentication data may take any form such as, but not limited to, audio recordings, photographic images, and video.

The enrollment data record of each authorized user includes data such as, but not limited to, enrollment biometric data, enrollment biometric templates, and personal data of the user. The enrollment biometric data is raw biometric data obtained from the user during enrollment in the AC system 12. The enrollment biometric data for each user is processed during enrollment to generate at least one enrollment biometric template, for each respective user, which may be used to conduct authentication transactions. The enrollment biometric data may also be used to conduct authentication transactions. Personal data includes any demographic information regarding a user including, but not limited to, a user's name, gender, age, date-of-birth, address, citizenship and marital status. Each enrollment data record may also include any kind of data that may be used to authenticate the identity of users.

The AC system 12 may detect biometric characteristics in captured authentication data in any manner. For example, the AC system 12 may detect the eyes in captured facial biometric image data. Moreover, the AC system 12 may determine user liveness based on captured authentication data or processed authentication data in any manner. Moreover, the AC system 12 may execute algorithms that create tree-based models and may execute the tree-based models themselves.

The DC device 10 and the AC system 12, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the DC device 10 and the AC system 12. The above examples are exemplary only, and are thus not intended to limit in any way the definition and/or meaning of the term "processor."

The respective memories (not shown) in the DC device 10 and the AC system 12 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the DC device 10 and the AC system 12. Moreover, each of the respective memories (not shown) can be a computer-readable recording medium used to store computer programs or executable instructions that are executed, respectively, by the DC device 10 and the AC system 12. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

Figure 2:
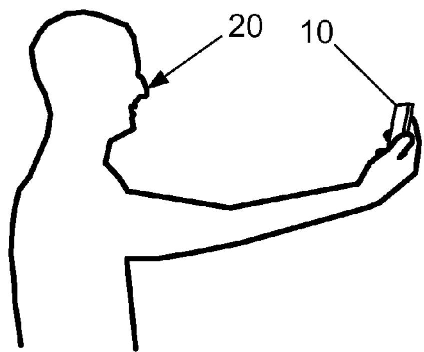
FIG. 2 is a side view of a user capturing authentication data from his self with the data capture device.

FIG. 2 is a side view of a user 20 capturing authentication data from his self with the DC device 10. Specifically, the DC device 10 and the user 20 are positioned relative to each other such that the DC device 10 may capture authentication data from the user 20. The DC device 10 may detect characteristics in captured biometric image data while capturing the authentication data or after capturing the authentication data. The DC device 10 is associated with at least one user who may be the person offering authentication data for capture. Instead of the user operating the DC device to capture authentication data from his self, another person may alternatively operate the DC device 10 to capture authentication data from the user 20.

Figure 3:
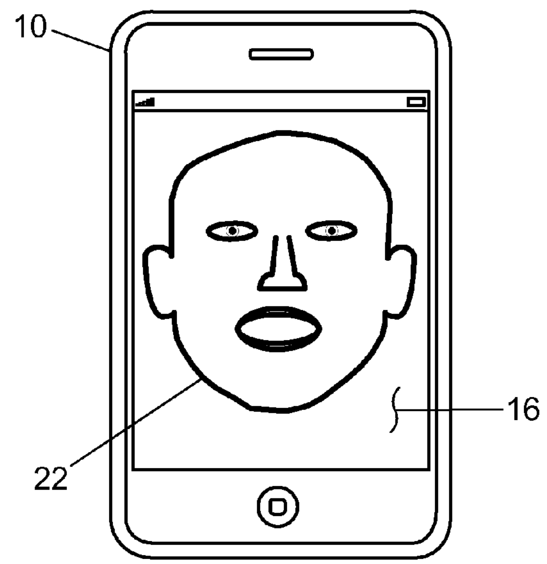
FIG. 3 is an enlarged plan view of the data capture device shown in FIG. 2, displaying an image of the user.

FIG. 3 is an enlarged plan view of the DC device 10 shown in FIG. 2, displaying a facial image 22 of the user 20 on the screen 16. The image 22 may be captured by the DC device 10 as authentication data in the form of a video. The video is made of frames.

Figure 4:
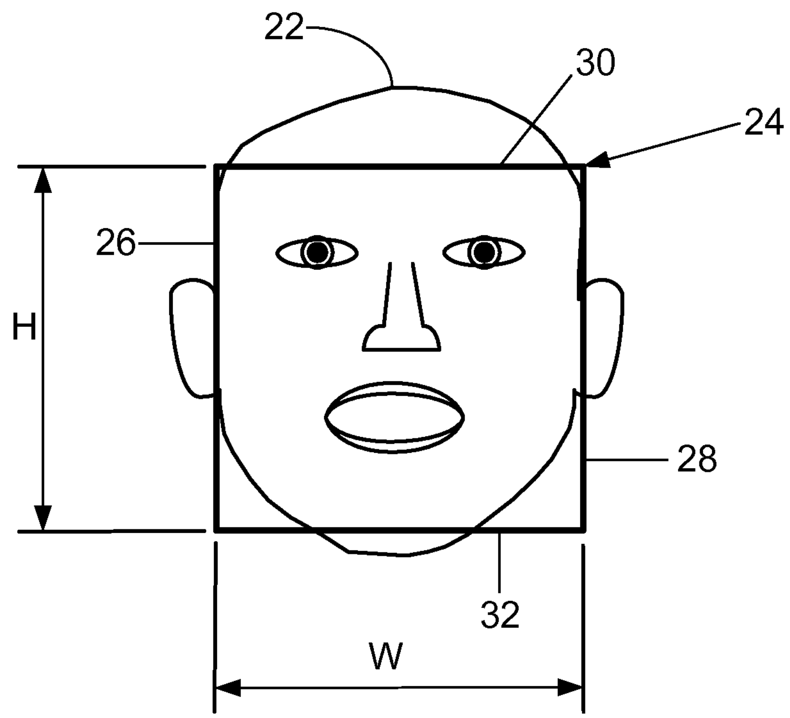
FIG. 4 is an enlarged plan view of the user image shown in FIG. 3, including a window arranged about the user image.

FIG. 4 is an enlarged view of the exemplary facial image 22 shown in FIG. 3 including a square window 24. The window 24 is generated by the face tracker software. The window has a first side 26, a second side 28, a top side 30, and a bottom side 32. The height of the window 24 is H and the width is W. The first 26 and second 28 sides are arranged to approximately align with the right and left sides of the facial image 22, respectively. As a result, the window 24 should be a different size for each user. The window 24 may also be a different size due to the distance between the user and the DC device 10 and due to image resolution. Although the window 24 is square, the window 24 may alternatively be any shape that facilitates detecting eyes as described herein. For example, the window 24 may be rectangular or elliptical. The window 24 defines an area of the facial image 22 that includes the eyes, nose, and mouth of the user. However, the face tracker software does not identify the coordinates or location of the eyes such that the eye locations may be used to conduct accurate liveness detection calculations.

Figure 5:
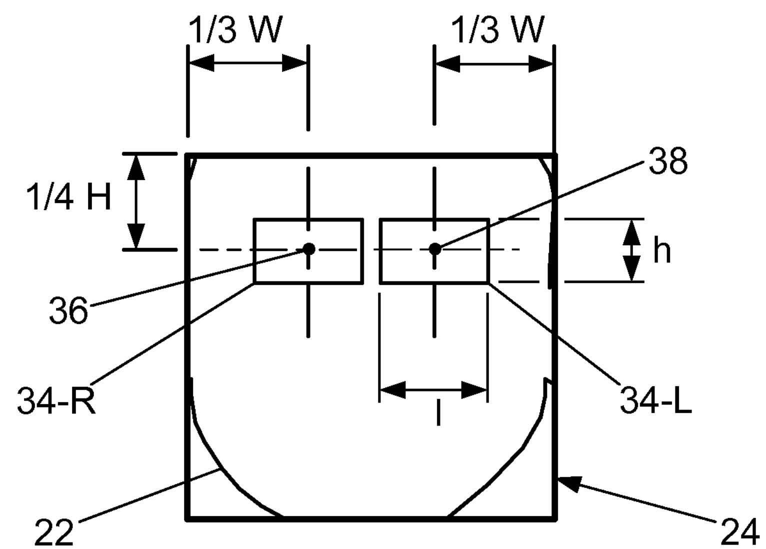
FIG. 5 is an enlarged plan view of the user image similar to that shown in FIG. 4, further including approximately located regions of interest.

FIG. 5 is an enlarged view of the exemplary facial image 22 similar to that shown in FIG. 4, further including a region of interest 34-R for the right eye and a region of interest 34-L for the left eye. Because the locations of the eyes cannot be accurately determined from the image 22, an approximate location for a right eye center point 36 is determined, and an approximate location for a left eye center point 38 is determined. More specifically, the right eye center point 36 is determined to be one-third (⅓) of the width (W) from the first side 26 and one-quarter (¼) of the height (H) from the top side 30. Likewise, the left eye center point 38 is determined to be one-third (⅓) of the width (W) from the second side 28 and one-quarter of the height (H) from the top side 30. The region of interest 34-R for the right eye is positioned about the right eye center point 36, and the region of interest 34-L for the left eye is positioned about the left eye center point 38.

Moreover, region of interest 34-R is centered about the approximate center point 36 and the region of interest 34-L is centered about the approximate center point 38. Because the center point 36, 38 locations are approximate, calculations based thereon may not be accurate. In order to enable more accurate calculations, the regions of interest 34-R, 34-L may be translated into different positions. Translating the regions of interest into different positions facilitates determining an adjustment that can be applied to the approximate center point locations 36, 38 to thus arrange the center points 36, 38 in more accurate positions.

The region of interest 34-R includes the area of the image 22 around the right eye and the region of interest 34-L includes the area of the image 22 around the left eye. The regions of interest 34-R, 34-L each include pixels that describe the eye and the area of the image 22 surrounding the eye. The regions of interest 34-R, 34-L are established for each frame in the video, and are rectangular. Thus, the regions of interest 34-R, 34-L each have a length (l) and a height (h). Moreover, the regions of interest 34-R, 34-L are the same size. Alternatively, the regions of interest 34-R, 34-L may be any shape that facilitates accurately detecting the location of eyes in an image. For example, the regions of interest 34-R, 34-L may be elliptical.

The information shown in FIGS. 6-9 is substantially the same information shown in FIG. 5 as described in more detail below. As such, features illustrated in FIGS. 6-9 that are identical to features illustrated in FIG. 5, are identified using the same reference numerals used in FIG. 5.

FIG. 6 is an enlarged view of the exemplary facial image 22 shown in FIG. 5. However, the regions of interest 34-R, 34-L are translated horizontally towards the first side 26. The regions of interest 34-R, 34-L may be horizontally translated through a displacement up to about fifteen percent of the length (l). However, the regions of interest may alternatively be horizontally translated through any displacement that facilitates detecting the location of eyes as described herein.

FIG. 7 is an enlarged view of the exemplary facial image 22 shown in FIG. 5. However, the regions of interest 34-R, 34-L are translated horizontally towards the second side 28.

FIG. 8 is an enlarged view of the exemplary facial image 22 shown in FIG. 5. However, the regions of interest 34-R, 34-L are translated vertically towards the top side 30. The regions of interest 34-R, 34-L may be vertically translated through a displacement up to about fifteen percent of the height (h). However, the regions of interest may alternatively be vertically translated through any displacement that facilitates detecting the location of eyes as described herein.

FIG. 9 is an enlarged view of the exemplary facial image 22 shown in FIG. 5. However, the regions of interest 34-R, 34-L are translated vertically towards the bottom side 32.

Figure 10:
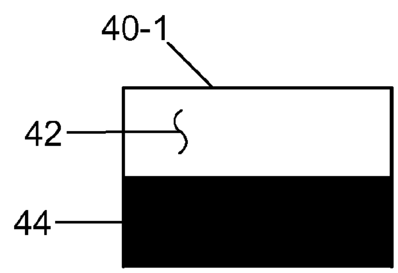
FIG. 10 is a diagram illustrating an exemplary detection window that may be used for calculating feature values.

FIG. 10 is a diagram illustrating an exemplary detection window 40-1 that may be used for calculating feature values for each frame included in captured authentication data. The detection window 40-1 is rectangular and includes two equal subareas, a first rectangular subarea 42 and a second rectangular subarea 44. The first rectangular area 42 forms a top half of the detection window 40-1 and the second rectangular area 44 forms a bottom half of the detection window 40-1. The second rectangular area 44 is shaded to facilitate distinguishing between the first and second areas. The arrangement of the rectangular areas 42, 44 within the window 40-1 determines the type of detection window. The subareas 42, 44 are in a type I arrangement. Thus, the window 40-1 is a type I detection window. The detection window 40-1 may be positioned over a region of interest 34-R, 34-L such that each subarea 42, 44 defines a group of pixels that may be used to calculate a feature value for the detection window position.

Figure 11:
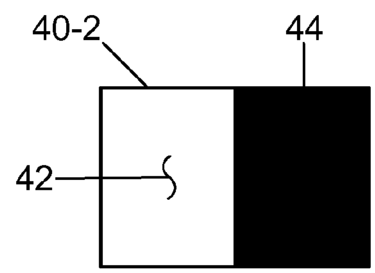
FIG. 11 is a diagram illustrating an alternative exemplary detection window.

FIG. 11 is a diagram illustrating an alternative exemplary detection window 40-2 similar to the detection window 40-1 shown in FIG. 10. However, the first rectangular subarea 42 forms a left half of the detection window 40-2 and the second rectangular subarea 44 forms a right half of the detection window 40-2. The first 42 and second 44 rectangular subareas are equal. The arrangement of the subareas 42, 44 within the window 40-2 is a type II arrangement. Thus, the window 40-2 is a type II detection window.

Figure 12:
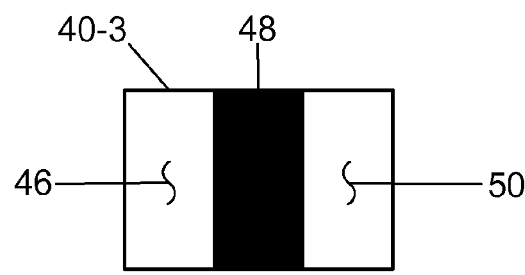
FIG. 12 is a diagram illustrating another alternative exemplary detection window.

FIG. 12 is a diagram illustrating another alternative exemplary detection window 40-3 similar to the detection window 40-1 shown in FIG. 10. However, the detection window 40-3 includes three equal rectangular subareas, a first subarea 46, a second subarea 48 and a third subarea 50. The second subarea 48 is shaded to facilitate distinguishing the three subareas from each other. The non-shaded areas 46 and 50 may be combined to form a composite subarea. Thus, when the detection window 40-3 is positioned over a region of interest 34-R, 34-L, rectangular areas 46 and 50 may define a composite pixel group. The arrangement of the three rectangular sub areas 46, 48, 50 is a type III arrangement. Thus, the window 40-3 is a type III detection window.

Figure 13:
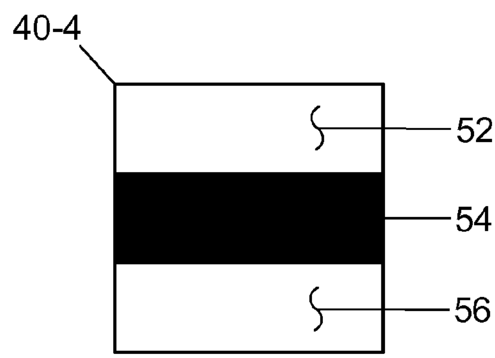
FIG. 13 is a diagram illustrating yet another alternative exemplary detection window.

FIG. 13 is a diagram illustrating an alternative exemplary detection window 40-4. The alternative detection window 40-4 is square and includes three equal rectangular subareas, a first subarea 52, a second subarea 54, and a third subarea 56. The first subarea 52 forms a top third of the window 40-4, the second rectangular subarea 54 forms a middle third of the window 40-4, and the third rectangular subarea 56 forms a bottom third of the window 40-4. The second subarea 54 is shaded to facilitate distinguishing the three subareas from each other. The non-shaded subareas 52 and 56 may be combined to form a composite subarea such that when the window 40-4 is positioned over a region of interest 34-R, 34-L, the rectangular subareas 52 and 56 may define a composite pixel group. The arrangement of the three rectangular subareas 52, 54, 56 is a type IV arrangement. Thus, the window 40-4 is a type IV detection window.

Figure 14:
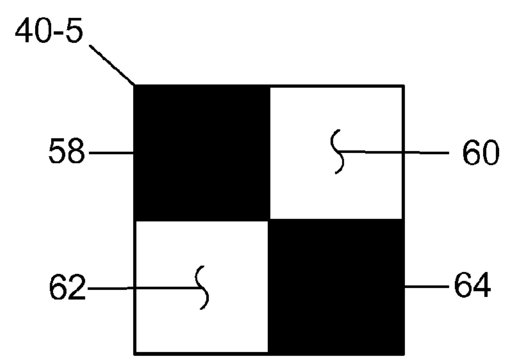
FIG. 14 is a diagram illustrating another alternative exemplary detection window.

FIG. 14 is a diagram illustrating another alternative exemplary detection window 40-5 similar to the detection window 40-4 shown in FIG. 13. However, the detection window 40-5 includes four equal square subareas, a first subarea 58, a second subarea 60, a third subarea 62, and a fourth subarea 64. The shaded subareas 58 and 64 may be combined to form a first composite subarea, and the subareas 60 and 62 may be combined to form a second composite subarea, such that when the window 40-5 is positioned over a frame included in captured authentication data the subareas 58 and 64, and the subareas 60 and 62, define respective composite pixel groups.

Although the detection windows 40-1 to 40-3 are rectangular, and the detection windows 40-4 and 40-5 are square, the detection windows 40-1 to 40-5 may alternatively be any shape that facilitates calculating feature values such as, but not limited to, elliptical. Moreover, the detection windows 40-1 to 40-5 may be any size that facilitates calculating feature values. Furthermore, the subareas 42, 44, 46, 48, 50, 52, 54, 56, 58, 60, 62, and 64 may alternatively be any shape and size that facilitates calculating feature values. Additionally, it should be understood that many different types of detection window may be provided in addition to types I-V described herein. Such other types of detection windows may include any number of the same or differently shaped subareas. The detection windows 40-1 to 40-5, as well as any other types of detection windows, may be stored in the DC device 10, the AC system 12, or any system (not shown) or device (not shown) that is operable to communicate with the DC device 10 over the network 18.

Figures 15, 16:
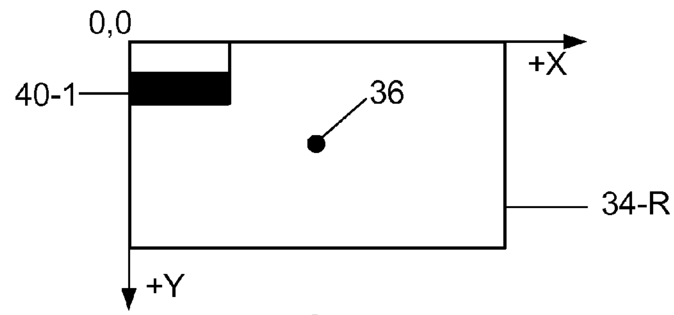
FIG. 15 is an enlarged plan view of an exemplary region of interest as shown in FIG. 5 including the exemplary detection window shown in FIG. 10.
FIG. 16 is a diagram illustrating an exemplary look-up table.

FIG. 15 is an enlarged plan view of the exemplary region of interest 34-R including the exemplary detection window 40-1. The region of interest 34-R includes biometric data that was not captured during an authentication transaction. Moreover, the region of interest 34-R is centered about the approximate right eye center point 36. A two-dimensional Cartesian coordinate system having X and Y-axes is associated with the region of interest 34-R. The origin (0,0) of the Cartesian coordinate system is coincident with an upper left hand corner of the region of interest 34-R. Alternatively, the origin may be coincident with any corner of the region of interest 34-R.

The detection window 40-1 is positioned in an upper left hand corner of the region of interest 34-R and has an area smaller than the region of interest 34-R. The detection window 40-1 may be incrementally moved over the entire region of interest, horizontally and vertically, to occupy many different incremental positions within the entire region of interest 34-R. The X and Y coordinates for the upper left hand corner of the detection window are calculated for each incremental position. Alternatively, the X and Y coordinates for any corner of the detection window may be calculated, or the coordinates of the detection window center point may be calculated.

Generally, the window 40-1 is incrementally moved, in the positive direction along the X-axis, from an upper left corner of the region of interest 34-R to an upper right corner of the region of interest 34-R. After moving the window by one increment in the positive direction along the Y-axis, the window is incrementally moved, in the negative direction along the X-axis, to the left side of the region of interest 34-R. The region of interest 34-R is thus incrementally moved over the entire region of interest 34-R. The increment is a single pixel. However, the increment may alternatively be any number of pixels that facilitates detecting eyes in captured authentication data as described herein. The detection window 40-1 is located within the region of interest 34-R while being incrementally positioned.

At each different incremental position, the subareas 42 and 44 define groups of pixels, within the region of interest 34-R, that are to be used for calculating a feature value for each respective incremental position. More specifically, after moving the window 40-1 into an incremental position, the pixels within the first 42 and second 44 rectangular subareas, respectively, are identified. The pixels within the first subarea 42 constitute a first pixel group and the pixels within the second subarea 44 constitute a second pixel group. Each pixel has an intensity value. The intensity values of the pixels in the first pixel group are averaged to calculate a first average pixel value, and the intensity values of the pixels in the second pixel group are averaged to calculate a second average pixel value. The feature value for the incremental position is calculated as the difference between the first and second average pixel values. The calculated feature value and the X and Y coordinates of the window position are stored in the DC device 10, the AC system 12, or any system (not shown) or device (not shown) that is operable to communicate with the DC device 10 over the network 18. After storing the calculated feature value and corresponding window coordinates, the window is incrementally moved into a new position and the feature value and corresponding window coordinates are determined for the new position.

The detection windows 40-2, 40-3, 40-4, 40-5 are similarly incrementally moved over the entire region of interest and a feature value and corresponding window coordinates are determined for each position of the windows 40-2, 40-3, 40-4, 40-5. However, it should be appreciated that the detection windows may alternatively be incrementally moved over the entire region of interest in any manner that facilitates calculating feature values as described herein. Moreover, it should be understood that different sized detection windows of the same or different type may additionally, or alternatively, be incrementally moved over the entire region of interest. For example, two different sized type I detection windows as well as two different sized detection windows of a type different than types I to V, may additionally, or alternatively, be moved over the entire region of interest. Thus, it should be understood that many different sized windows of the same type and of different types may be moved over the region of interest 34-R in any manner that facilitates calculating feature values as described herein.

The region of interest 34-R may be translated horizontally relative to the center point 36 as shown in FIGS. 6 and 7, and may be translated vertically relative to the center point 36 as shown in FIGS. 8 and 9. For each of these translated positions of the region of interest 34-R, each of the detection windows is incrementally moved over the entire region of interest 34-R, and a feature value and corresponding coordinates are determined as described herein for each position of the detection windows 40-1, 40-2, 40-3, 40-4, and 40-5. The processing of the pixel data within the regions of interest 34-R and 34-L is identical. Consequently, the discussion regarding the region of interest 34-R applies to region of interest 34-L.

After calculating a feature value and coordinates for each incremental position of the detection windows 40-1 to 40-5, for each position of the region of interest, a vector is created for the frame. A vector is created for each frame included in the captured biometric data. After creating vectors for all of the frames included in the captured biometric data, the vectors are processed by an algorithm. The algorithm processes vectors to create tree-based models that may be used to facilitate performing efficient calculations during liveness detection. Moreover, the algorithm may create different tree-based models from the same vector, or vectors. Specifically, a vector may be processed to create a first tree-based model that calculates horizontal displacements and be processed to create a second tree-based model for calculating vertical displacements. The horizontal and vertical displacements are of the center points 36, 38. It should be understood that the tree-based models are created before authentication transactions and are used during authentication transactions. The first and second tree-based models may be random forest models which may facilitate faster processing when implemented.

By virtue of creating the first tree-based model, the first algorithm automatically determines, or judges, which window types, sizes, and positions are most relevant to determining horizontal displacements of the approximate locations of the center points 36, 38. Moreover, by virtue of creating the second tree-based model, the second algorithm automatically determines, or judges, which window types, sizes, and positions are most relevant to determining vertical displacements of the approximate locations of the center points 36, 38.

FIG. 16 is a diagram illustrating an exemplary look-up table 66 that includes information regarding combinations of window type, window size, and window position deemed most relevant to determining horizontal displacements for the approximate locations of the center points 36, 38. The window size is given in width and height while the position is given in X, Y coordinates. The X, Y coordinates are those coordinates calculated while moving the detection windows 40-1 to 40-5 incrementally over the region of interest 34-R, for each position of the region of interest 34-R. The upper left corner of each detection window is positioned, on the region of interest, at the corresponding X, Y coordinates listed in the table 66. The table 66 includes twenty-two different combinations of window type, window size, and window position. Alternatively, the table 66 may include any number of different combinations of window type, window size, and window position.

The window types that may be included in table 66 include types I-V. More specifically, table 66 includes four combinations for each of type I, II, and III windows, and five combinations for each of type IV and V windows. However, it should be understood that if a window type and all the associated size and position combinations are not deemed to be most relevant, then a window type may not be included in the table 66. For example, when none of the size and position combinations for a type II detection window are deemed most relevant, the type II detection window would not be included in the table 66. The number of occurrences of each window type within the table 66 is generally different. A second look-up table (not shown) may be generated that includes combinations of window type, window size, and window position deemed most relevant to determining vertical displacements of the approximate locations of center points 36 and 38. The first and second look-up tables may be stored in the DC device 10, the AC system 12, or any system (not shown) or device (not shown) operable to communicate with the DC device 10 over the network 18.

During authentication transactions, after capturing authentication data from a user, the regions of interest 34-R and 34-L are identified and feature values are calculated for each frame in the captured authentication data. A feature value is calculated for each combination of window type, size, and position as listed in the look-up tables. More specifically, each detection window is positioned on the region of interest 34-R, in each position of the region of interest 34-R, at the corresponding coordinates listed in the tables, and a feature value is calculated for each window, size, and position combination as listed in the tables.

The information shown in FIGS. 17-21 is substantially the same information shown in FIG. 15 as described in more detail below. As such, features illustrated in FIGS. 17-21 that are identical to features illustrated in FIG. 15, are identified using the same reference numerals used in FIG. 15.

Figure 17:
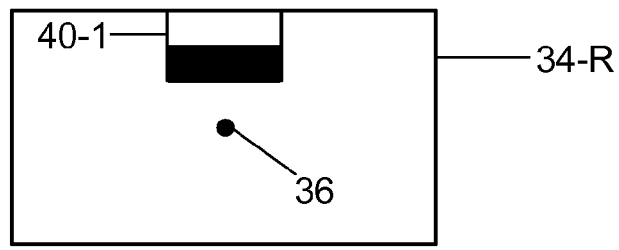
FIG. 17 is an enlarged plan view of an exemplary region of interest including a type I detection window.

FIG. 17 is an enlarged plan view of authentication data, within the region of interest 34-R, captured during an authentication transaction, that includes an exemplary type I detection window 40-1 positioned over the region 34-R in accordance with the look-up tables. A feature value is calculated for the exemplary type I detection window position. The region of interest 34-R is for a single frame included in the captured authentication data. Moreover, the region of interest 34-R is centered about the center point 36 as shown in FIG. 5.

Figure 18:
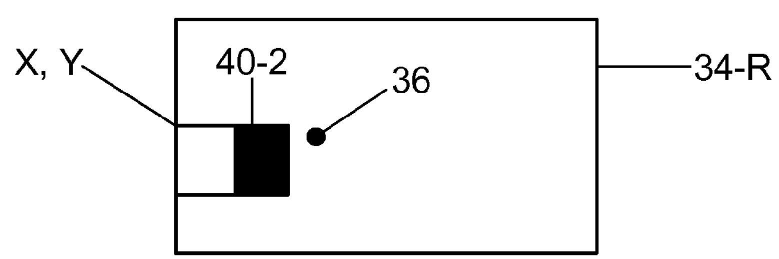
FIG. 18 is an enlarged plan view of an exemplary region of interest including a type II detection window.

FIG. 18 is an enlarged plan view of authentication data, within the region of interest 34-R, captured during an authentication transaction, that includes an exemplary type II detection window 40-2 positioned over the region 34-R in accordance with the look-up tables. The X, Y coordinates of the upper left corner of the window 40-2 are used to position the window 40-2 over the region of interest 34-R. A feature value is calculated for the exemplary type II detection window position. The region of interest 34-R is for the same frame shown in FIG. 17. Moreover, the region of interest 34-R is translated horizontally relative to the center point 36 as shown in FIG. 7.

Figure 19:
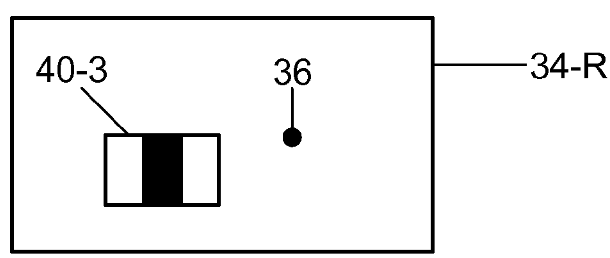
FIG. 19 is an enlarged plan view of an exemplary region of interest including a type III detection window.

FIG. 19 is an enlarged plan view of authentication data, within the region of interest 34-R, captured during an authentication transaction, that includes an exemplary type III detection window 40-3 positioned over the region 34-R in accordance with the look-up tables. A feature value is calculated for the exemplary type III detection window position. The region of interest 34-R is for the same frame shown in FIG. 17. Moreover, the region of interest 34-R is translated horizontally relative to the center point 36 as shown in FIG. 6.

Figure 20:
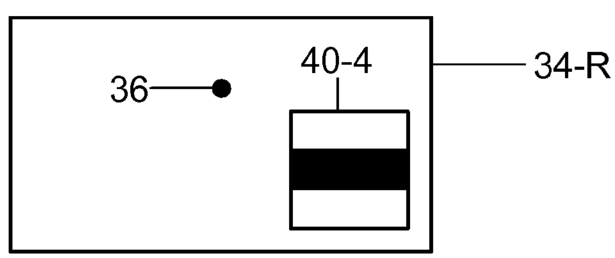
FIG. 20 is an enlarged plan view of an exemplary region of interest including a type IV detection window.

FIG. 20 is an enlarged plan view of authentication data, within the region of interest 34-R, captured during an authentication transaction, that includes an exemplary type IV detection window 40-4 positioned over the region 34-R in accordance with the look-up tables. A feature value is calculated for the exemplary type IV detection window position. The region of interest 34-R is for the same frame shown in FIG. 17. Moreover, the region of interest 34-R is translated vertically relative to the center point 36 as shown in FIG. 9.

Figure 21:
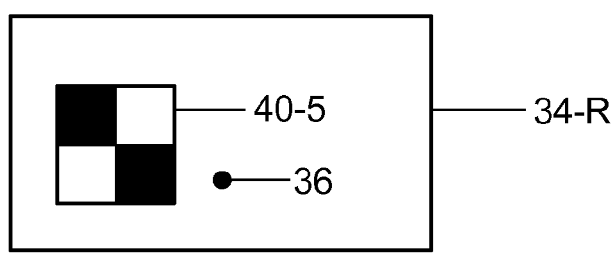
FIG. 21 is an enlarged plan view of an exemplary region of interest including a type V detection window.

FIG. 21 is an enlarged plan view of authentication data, within the region of interest 34-R, captured during an authentication transaction, that includes an exemplary type V detection window 40-5 positioned over the region 34-R in accordance with the look-up tables. A feature value is calculated for the exemplary type V detection window position. The region of interest 34-R is for the same frame shown in FIG. 17. Moreover, the region of interest 34-R is translated vertically relative to the center point 36 as shown in FIG. 8.

The feature values calculated for the combinations listed in the look-up tables are used to calculate a displacement for the approximate locations of the center points 36, 38. More specifically, the calculated feature values are processed by the first and second tree-based models which calculate a horizontal and vertical displacement, respectively, for the center points 36, 38. The first and second models may be implemented to function as a regressor or to function as a classifier. The horizontal and vertical displacements are values for adjusting the approximate locations of the center points 36, 38 to more accurate locations.

Figure 22:
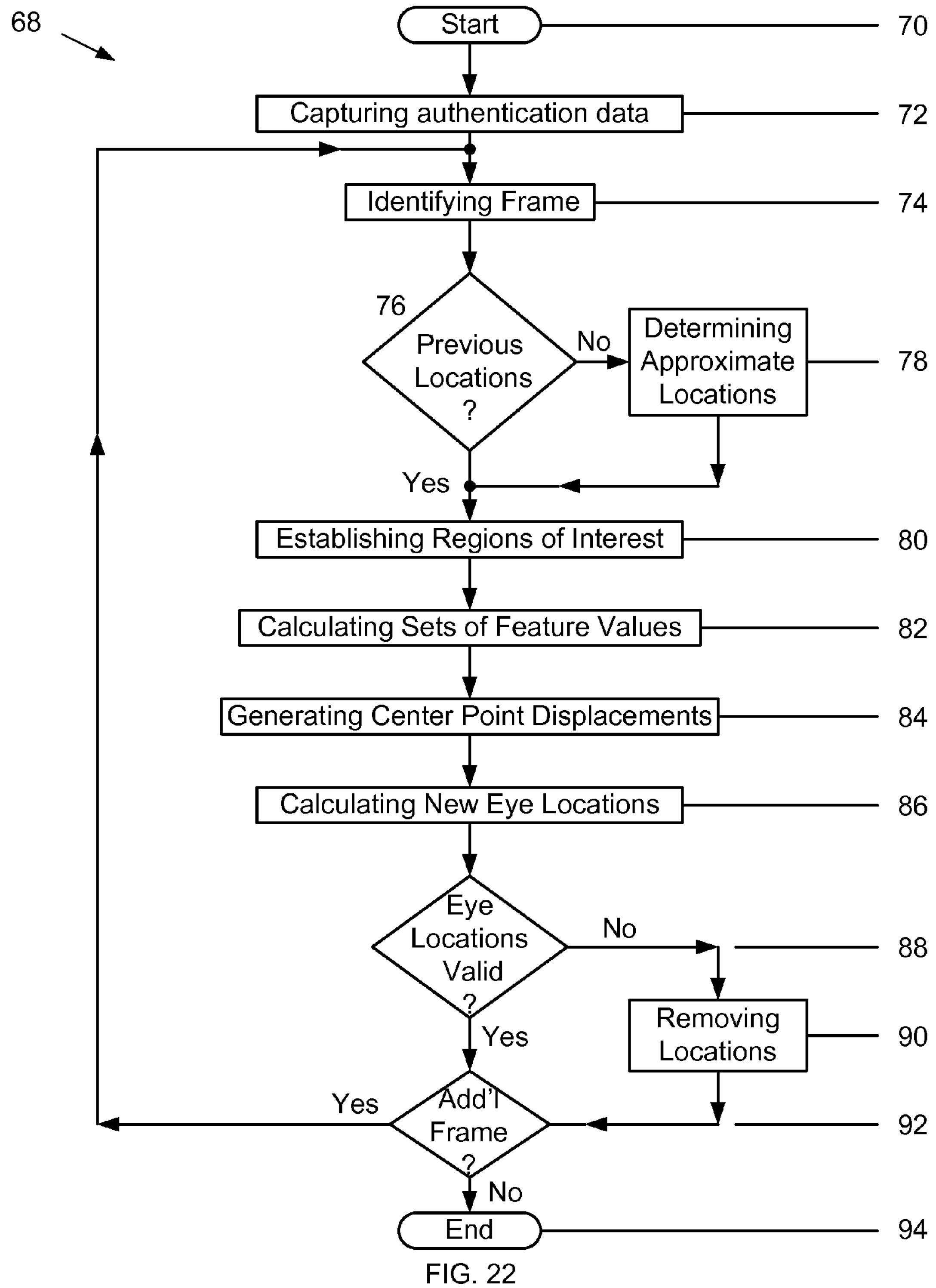
FIG. 22 is a flowchart illustrating an exemplary method for detecting biometric features in an image.

FIG. 22 is a flowchart 68 illustrating an exemplary method for detecting biometric characteristics in an image during authentication transactions. The process starts 70 with a user activating his DC device 10 and capturing facial authentication data 72 from his self with the DC device 10. The facial authentication data is captured as a video and face tracker software stored in the DC device 10 arranges a window about the image 22 in each frame. Next, processing continues by identifying 74 an initial frame in the captured authentication data, recording 76 the time stamp of the frame, and determining eye location data for the eyes. More specifically, processing continues by determining 76 whether eye location data for each eye has been stored for an immediately preceding frame in the video. The eye location data is stored as the coordinates of the center point 36 and of the center point 38.

When eye location data for an immediately preceding frame is not stored 76, processing continues by determining 78 an approximate location for the center point 36 and center point 38. More specifically, the center point 36 is located approximately one-third of the window width (W) from the first side 26 and one-quarter of the window height (H) from the top side 30. Similarly, the center point 38 is located approximately one-third of the window width (W) from the second side 28 and one-quarter of the window height (H) from the top side 30. Otherwise, when eye location data is stored for each eye, the stored data is used as the approximate location of the center points 36, 38.

Next, processing continues by establishing 80 the regions of interest 34-R, 34-L and positioning the regions of interest about the center points 36 and 38, respectively. The regions of interest 34-R, 34-L are initially positioned such that the center points 36 and 38 are coincident with the center of the regions of interest 34-R, 34-L. The regions of interest 34-R, 34-L may also be displaced from the center points 34-R, 34-L, respectively, as shown in FIGS. 6 to 9.

After determining the positions of the regions of interest 34-R, 34-L, processing continues by calculating 82 a set of feature values for each position. More specifically, processing continues by calculating a feature value 82 for each combination of window type, window size, and window position listed in the first look-up table 66 and in the second look-up table (not shown), for each position of the regions of interest 34-R, 34-L. Next, processing continues by generating 84 center point displacements for each set. More specifically, each different set of feature values is processed by both the first and second tree-based models which generate a horizontal displacement and a vertical displacement, respectively. Thus, a horizontal and vertical displacement are generated for each position of the regions of interest 34-R, 34-L. Moreover, a horizontal and vertical displacement is computed for center point 36, 38.

After generating the horizontal and vertical displacements, processing continues by calculating a median horizontal displacement and a median vertical displacement from the horizontal and vertical displacements. Next processing continues by calculating new eye locations 86 by adjusting the approximate location of center points 36, 38 by the median horizontal and vertical displacements. The adjusted locations may be stored in the DC device 10, the AC system 12, and other systems (not shown) and devices (not shown) operable to communicate with the DC device 10 over the network 18. Adjusting the estimated center point 36, 38 locations, facilitates accurately locating the center points 36, 38 in true locations of the right and left eyes, respectively.

Processing continues by determining 88 whether the adjusted center points 36, 38 represent valid locations by comparing the adjusted locations against the window sides 26, 28, 30, 32. For example, if the adjusted locations are outside of the window 24, the adjusted locations are invalid 88. Next, processing continues by removing 90 the adjusted center point 36, 38 locations from storage and determining 92 whether there is an additional frame in the captured authentication data. Otherwise, if the adjusted center point 36, 38 locations are within the window 24, the adjusted center point locations are valid 88 and processing continues by determining 92 whether there is an additional frame in the captured authentication data. Valid locations may be used to conduct accurate calculations dependent upon accurate eye locations, for example, eye blink detection calculations. If so, processing continues by identifying 74 the additional frame. Otherwise, processing ends 94.

Although validity of the adjusted locations is determined by comparing the adjusted locations against the window sides, the validity of the adjusted locations may alternatively be determined in any manner. For example, yet another tree-based model may be developed and applied to the region of interest in the positions shown in FIGS. 5 to 9, using the adjusted center point locations 36, 38. Doing so determines that the regions of interest 34-R, 34-L centered about the adjusted center points 36, 38, respectively, contain pixel data representing true eyes.

Although the median horizontal and vertical displacements are calculated in the exemplary process, the average of the horizontal and vertical displacements may alternatively be calculated and used to adjust the approximate location of the center points 36, 38.

Although the biometric characteristic located in the exemplary method is the eyes, the biometric characteristic may alternatively be any biometric characteristic included in the captured authentication data. For example, the biometric characteristic may be the mouth.

In each embodiment, the above-described methods and systems for detecting biometric characteristics in an image facilitate accurately determining the locations of characteristic in captured biometric data processed by face tracker software. More specifically, an approximate location of each eye included in a frame of captured authentication data is determined. Feature values for a frame included in the captured authentication data are calculated and are used to calculate horizontal and vertical displacements of the approximate location of each eye. After determining the horizontal and vertical displacements, the horizontal and vertical displacements are applied to the approximate location of each eye to locate the eye in a truer position. As a result, the location of eyes included in biometric data that has been processed by face tracker software, may be quickly, easily, and economically determined.

Exemplary embodiments of methods for detecting biometric characteristics in an image are described above in detail. The methods are not limited to use with the specific authentication computer systems described herein, but rather, the methods can be utilized independently and separately from other computer components described herein. For example, the methods for detecting biometric characteristics in an image described herein may be implemented by most computer systems, and may be used for a wide range of biometric feature detection scenarios, including detecting a user's mouth in captured biometric data. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for detecting biometric characteristics in a captured biometric data image comprising:

determining, by a processor, an approximate location for a biometric characteristic in a frame, the frame being included in captured biometric data;

determining region of interest positions over the frame;

calculating a set of feature values for each position;

generating a displacement for each set of feature values and generating a median displacement; and adjusting the biometric characteristic location by the median displacement.

2. A method for detecting biometric characteristics in accordance with claim 1, said determining region of interest positions step comprising:

centering a region of interest about the approximate location;

translating the region of interest such that the region of interest is not centered about the approximate location.

3. A method for detecting biometric characteristics in accordance with claim 1, said calculating step comprising calculating a feature value for each combination of window type, window size, and window position listed in a look-up table.

4. A method for detecting biometric characteristics in accordance with claim 1, said generating step comprising processing each feature value set with a first tree-based model and a second tree-based model, the first tree-based model generates a horizontal displacement and the second tree-based model generates a vertical displacement.

5. A method for detecting biometric characteristics in accordance with claim 1, said generating step comprising calculating a median horizontal displacement and a median vertical displacement.

6. A system for detecting biometric characteristics in an image comprising:

a processor; and a memory configured to store locations of a biometric characteristic, said processor being programmed to:

determine an approximate location for a biometric characteristic in a frame;

determine region of interest positions over the frame;

calculate a set of feature values for each position;

generate a displacement for each set of feature values and generate a median displacement; and adjust the biometric characteristic location by the median displacement.

7. A system for detecting biometric characteristics in accordance with claim 6, said processor being further programmed to:

center a region of interest about the approximate location;

translate the region of interest such that the region of interest is not centered about the approximate location.

8. A system for detecting biometric characteristics in accordance with claim 6, said processor being further programmed to calculating a feature value for each combination of window type, window size, and window position listed in a look-up table.

9. A system for detecting biometric characteristics in accordance with claim 6, said processor being further programmed to process each feature value set with a first tree-based model and a second tree-based model, the first tree-based model generates a horizontal displacement and the second tree-based model generates a vertical displacement.

* * * * *